July 30, 1935.                R. SEDLATSCHEK                2,009,525

SHUTTLE

Filed Aug. 25, 1934

INVENTOR.
Richard Sedlatschek,
BY
ATTORNEY.

Patented July 30, 1935

2,009,525

UNITED STATES PATENT OFFICE 2,009,525

SHUTTLE

Richard Sedlatschek, Paterson, N. J., assignor to United Reed and Harness Company, Paterson, N. J., a firm composed of Richard Sedlatschek and Frank Sedlatschek Application August 25, 1934, Serial No. 741,461

3 Claims. (Cl. 139—208)

In Patent No. 1,936,226, to Comisky, a shuttle of the type whose spindle is pivoted so as to be raised for replenishing the filling has such spindle provided at its butt with opposite lateral ears or pads which engage the shuttle body in the depressed position of the spindle with the object of delaying the time when, after repeatedly allowing the spindle to descend to such depressed or working position under the full force of its spring, the spindle will stand with its point or free end so low that the weft or filling will cease to pay off freely from the wound weft mass. Previously to that improvement, if the spindle point came to assume the unduly low position, which was because the spindle pivoting pin or the spindle stop pin became bent, it was usually not possible to remove and straighten the pin and then return it and expect it to be held from working out because the enlarging of the hole for the pin which resulted from bending the latter produced an imperfect fit of the pin in the hole, wherefore the only alternative was either at undue expense to provide a thicker pin and re-bore the shuttle body, using another spindle having a hole of the same diameter as the re-bore thus formed, or to re-bore both said body and spindle to receive such pin or to bend the spindle so as to return its point to the proper level, which latter frequently caused splitting of the quill or core for the weft mass unless the weaver were careful to remove it from the spindle or only aggravated the failure of the weft to feed off freely as an incident of the distortion of the spindle which necessarily ensued. The mentioned improvement was an important one in its class in that it at least, as indicated, delayed the time when the indicated fault would manifest itself, but it accomplished no more because once the ears formed an impression in the permanent (wood) part of the shuttle against which they impinged the only remedy apart from replacing the shuttle with a new one was to bend the spindle to bring its point to the proper level.

According to this invention I retain the ears or pads but instead of having them impinge against a permanent part of the shuttle body I provide the latter with an anvil means to receive the impact of such ears or pads and which is removably attached to such body independently of the spindle. Being removably attached, so long as the shuttle remains otherwise serviceable the anvil means can be replaced by a new one when, after repeated impact of the ears therewith, defective positioning of the spindle point ensues; and being so attached independently of the spindle it remains always in position whether or not the spindle is depressed and so acts to clamp the anvil means to the shuttle body.

Figure 1:
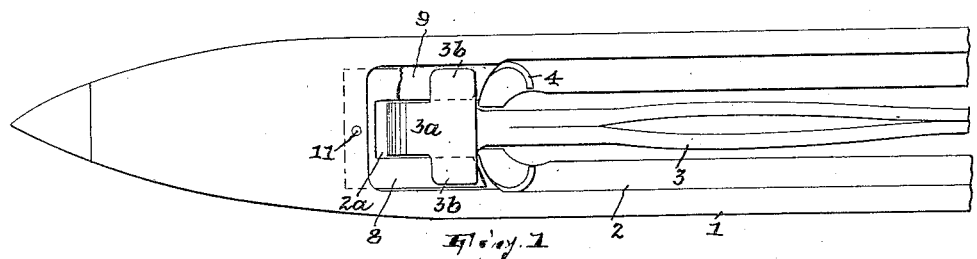
Fig. 1 is a fragmentary plan of a shuttle embodying the invention, a certain plate 8 being shown partly broken away.

The shuttle body 1 has the usual cavity 2 which the metal spindle 3 and the weft package thereon occupy when depressed, the spindle-butt 3a and the two usual clips 4 which flank it on both sides being arranged in an extension 2a of said cavity. The clips are held in place by two pins 5 one of which forms the pivot for the shuttle. As in the mentioned Comisky patent the spindle-butt has a pair of opposite lateral ears or pads 3b which, as will appear, determine the extent to which the spindle may be depressed. There is also the usual spring 6 supported in cavity-extension 2a by the pins 7 (also penetrating the clips) and bearing against the end of the spindle-butt in such manner that when the spindle is either elevated or depressed to the limit determined by the ears 3b the spindle is held by the spring in such position. It will be understood that the projecting hook-shaped ends of the clips 4 are adapted to receive the head of the weft-quill or core (not shown) arranged on the spindle, thus to hold the quill against lengthwise displacement.

The spring is usually so related to the spindle-butt that when the spindle stands raised it requires but slight movement toward depressed position to bring the spring into action to complete the depressing movement, the object being to have the spring act powerfully on the spindle when standing depressed in order to hold it firmly or against pivotal displacement when the shuttle is operating. This condition invites the weaver to allow the spindle to snap down under the full force of the spring, and when this is repeatedly done the ears 3b, which in the mentioned Comisky construction contact with the wood of the shuttle body, in time impress the wood so that the point of the depressed spindle stands below its intended position, with consequent failure of the weft to feed off properly from the quill and other faults.

Figure 2:
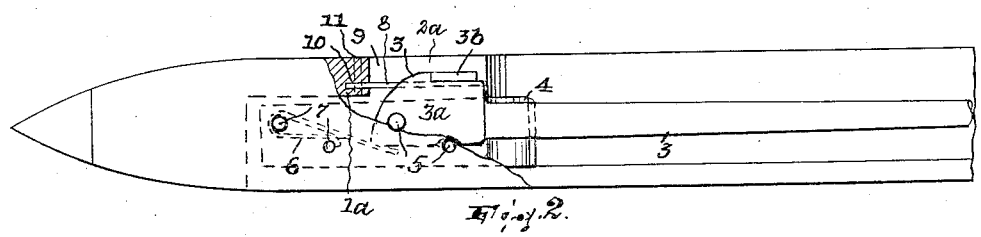
Fig. 2 is a side elevation thereof partly broken away.

To overcome this I attach removably to the shuttle body, in position to receive the impact and pressure of the ears, an anvil means, thus:

In Figs. 1 and 2 such means consists of a plate 8 of metal, as steel, which is forked in plan and has its crotch wide enough to receive the spindle butt. As in the Comisky shuttle the shuttle body has a top recess whose bottom affords a ledge 9 each side of the spindle-butt, and on these ledges the plate rests with its crotch open in the direction in which the spindle extends, the plate straddling the spindle-butt, the level of the plate being such that when the spindle is depressed and its ears rest on the plate the spindle will be correctly positioned, or here substantially horizontal. The plate is placed on the ledges before the spindle is mounted and it is preferably held in fixed position by being snugly fitted into a slot 10 which is formed horizontally in the overhang 1a of the shuttle body, 11 being a pin which is driven through such overhang and through a hole 12 in the plate.

Figure 3:
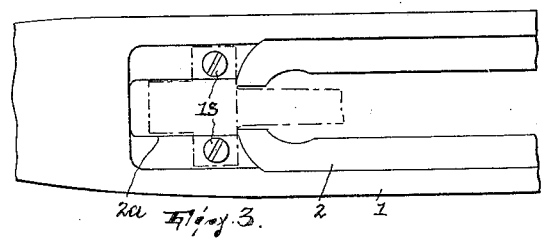
Figs. 3 and 4 are fragmentary plans of shuttles embodying modifications of the invention, the spindle being removed.

In Fig. 3, instead of this plate, I provide two screws 13 driven into the ledges in position to afford support for the ears of the spindle-butt when the spindle is depressed. This construction has the advantage that if, by wear or mutilation of the ears or the anvil formed by these screws under repeated snapping-down of the spindle, the latter becomes somewhat displaced below its intended position when depressed, adjustment can be effected, as by turning the screws, to correct the trouble; or the screws may be removed and replaced by fresh ones.

Figure 4:
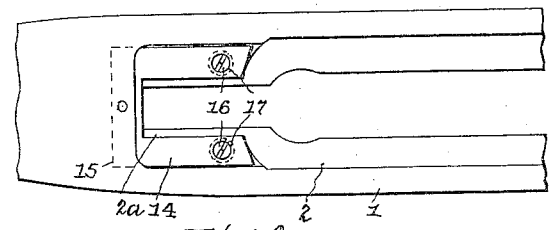
Figure 5:
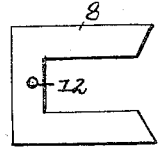
Fig. 5 shows the anvil means of Figs. 1 and 2.

In Fig. 4 both the plate and the screws are utilized. The plate 14 is of the same general form as first described and it straddles the spindle-butt and is received and held in a slot 15 in the same manner, but its legs or extremities rest on two screws 16, one at each side of the spindle butt and driven into the floor of the recess, access to which for the purpose of turning them and so adjusting the plate may be had through holes 17 in the plate-extremities of less diameter than the screw-heads.

Thus, if the spindle point comes to stand unduly depressed the life of the shuttle, so far as such a fault is concerned, can be prolonged indefinitely without greater expense than removing the existing anvil means and substituting a fresh one, or in those instances where adjustment is possible effecting such adjustment.

Since the plate is forked and straddles the spindle it is susceptible of being confined against displacement in its own plane in at least three directions (to wit forward, or toward the spindle point, and in each direction sidewise) by the spindle itself and when the spindle is depressed it is of course held clamped thereby against the shuttle body. Thus it is conceivable that independent securing means, as 10, might in practice be omitted, but I prefer at least to have the fixed structure of the shuttle oppose movement of the plate in the fourth lateral or rearward direction, or the direction in which the plate would cease to straddle the spindle.

Having thus fully described my invention what I claim is:

1. The combination, with a shuttle body having a weft-package-receiving cavity and a spindle having its butt pivoted in the body and occupying the cavity and having a lateral ear overhanging a portion of the body, of a plate arranged over such portion to underlie said ear when the spindle is depressed and removably attached to the body independently of the spindle and a screw under and affording support for the plate and driven into the body.

2. The combination, with a shuttle body having a weft-package-receiving cavity and a spindle having its butt pivoted in the body and occupying the cavity and having a lateral ear overhanging a portion of the body, of a plate arranged over such portion to underlie said ear when the spindle is depressed and removably attached to the body independently of the spindle and a screw under and affording support for the plate and driven into the body, said plate having an aperture registering with but of less diameter than the head of the screw.

3. The combination, with a shuttle body having a weft-package-receiving cavity and a spindle having its butt pivoted in the body and occupying the cavity and having a lateral ear overhanging a portion of the body, of a plate arranged over such portion to underlie said ear when the spindle is depressed, the body having a slot in which an edge of the plate is snugly fitted, and a securing device driven through the slot-receiving portion of said body and through the plate.

RICHARD SEDLATSCHEK.